(12) United States Patent
Vinson

(10) Patent No.: US 6,419,747 B1
(45) Date of Patent: Jul. 16, 2002

(54) EXTRUSION DIE

(75) Inventor: Kenneth D. Vinson, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/258,497

(22) Filed: Feb. 26, 1999

(51) Int. Cl.$^7$ .................................................. B05C 3/02
(52) U.S. Cl. ........................................ 118/411; 118/419
(58) Field of Search .............................. 239/566, 568; 118/410, 411, 412, 419; 425/464, 7, 72.2

(56) References Cited

U.S. PATENT DOCUMENTS

| | | | |
|---|---|---|---|
| 3,516,120 A | 6/1970 | Siegfried et al. ............... 18/12 |
| 3,825,380 A | * 7/1974 | Hardine et al. | |
| 3,840,158 A | 10/1974 | Baker et al. | |
| 4,043,739 A | 8/1977 | Appel | |
| 4,206,876 A | 6/1980 | Koch | |
| 4,372,739 A | 2/1983 | Vetter et al. | |
| 4,411,614 A | 10/1983 | Feathers | |
| 4,442,002 A | 4/1984 | Morris ....................... 210/411 |
| 4,521,456 A | * 6/1985 | Hanson | |
| 4,749,125 A | 6/1988 | Escallon et al. | |
| 5,067,432 A | 11/1991 | Lippert | |
| 5,223,276 A | 6/1993 | Djordjevic et al. | |
| 5,234,330 A | 8/1993 | Billow et al. | |
| 5,273,595 A | 12/1993 | Tomic et al. | |
| 5,334,247 A | * 8/1994 | Coleman et al. | |
| 5,421,921 A | * 6/1995 | Gill et al. | |
| 5,458,836 A | * 10/1995 | Rakestraw et al. | |
| 5,494,429 A | 2/1996 | Wilson et al. | |
| 5,522,931 A | 6/1996 | Iwashita et al. | |
| 5,634,976 A | * 6/1997 | Hosogaya et al. | |
| 5,858,096 A | 1/1999 | Madrzak et al. | |

FOREIGN PATENT DOCUMENTS

| | | |
|---|---|---|
| DE | 37 16 707 A | 12/1988 |
| EP | 0 678 339 A | 10/1995 |
| JP | 63189223 | 4/1988 |
| JP | 04190870 | 9/1992 |

* cited by examiner

*Primary Examiner*—Brenda A. Lamb
(74) *Attorney, Agent, or Firm*—Vladimir Vitenberg; David M. Weirich; Ken K. Patel

(57) ABSTRACT

An extrusion die for extruding a chemical functional additive for making a disposable paper product comprises a supply port and a distribution channel in fluid communication with the supply port. The distribution channel terminates with at least one discharge mouth having a passage cross-section therethrough. The discharge mouth comprises an entry orifice having an entry open area Ae, an exit orifice having an exit open area Ax, and a discharge distance defined between the entry orifice and the exit orifice. The exit open area Ax is greater than the entry open area Ae. This ensures that contaminants would pass through the discharge mouth, whereby plugging thereof is substantially avoided. Preferably, the passage cross-section of the discharge mouth continuously and gradually increases from the entry orifice to the exit orifice.

9 Claims, 3 Drawing Sheets

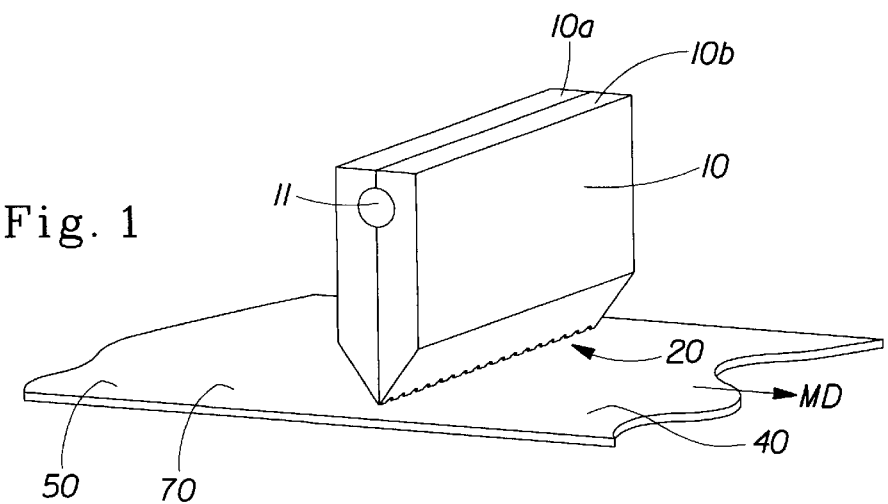
Fig. 1
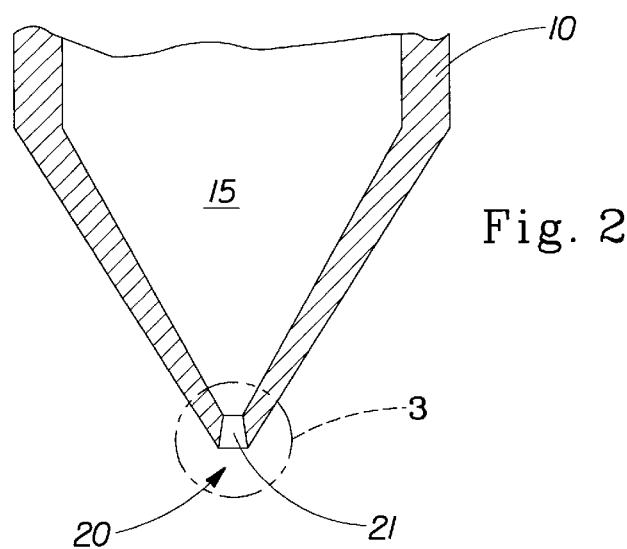
Fig. 2
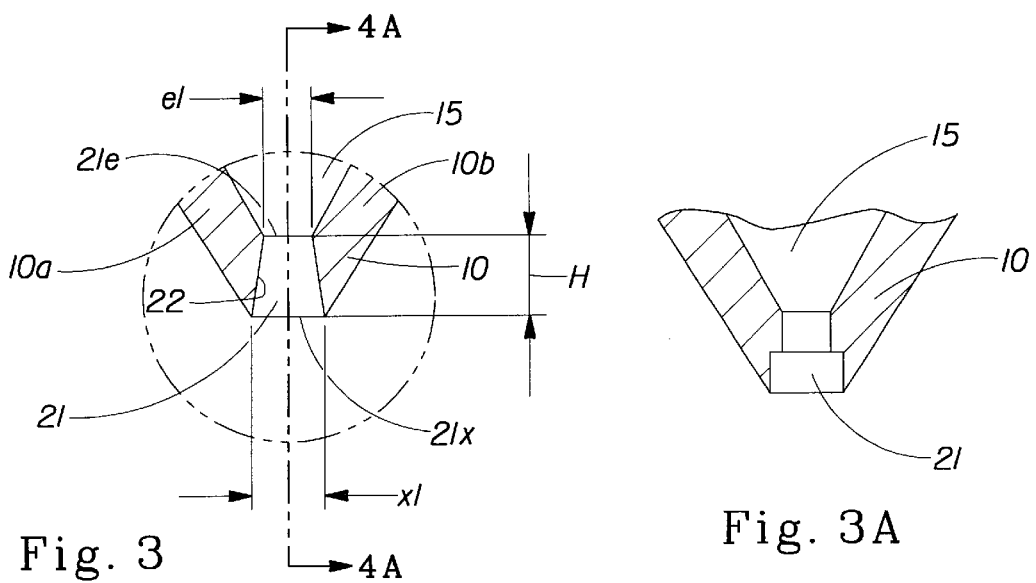
Fig. 3
Fig. 3A

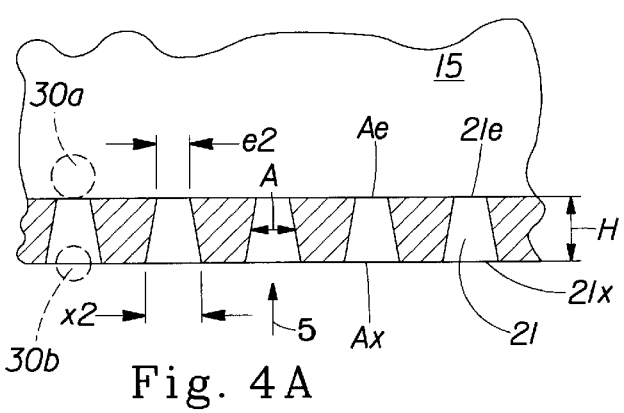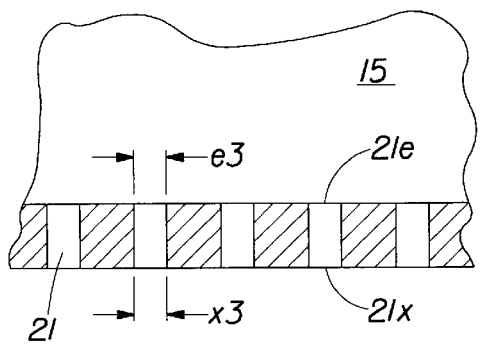
Fig. 4A  Fig. 4B
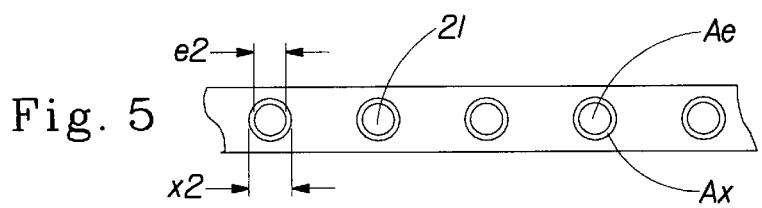
Fig. 5
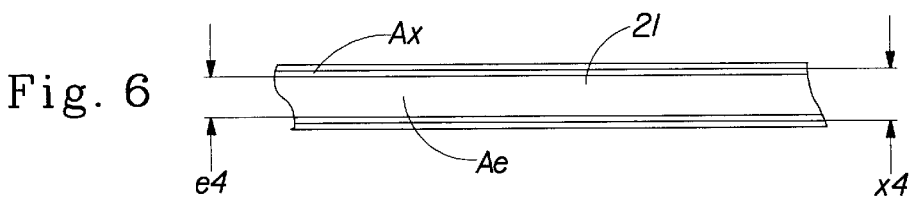
Fig. 6
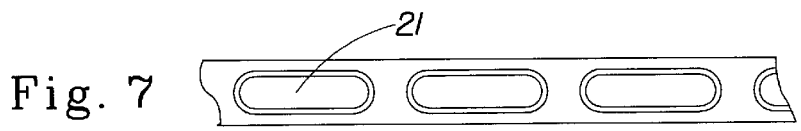
Fig. 7
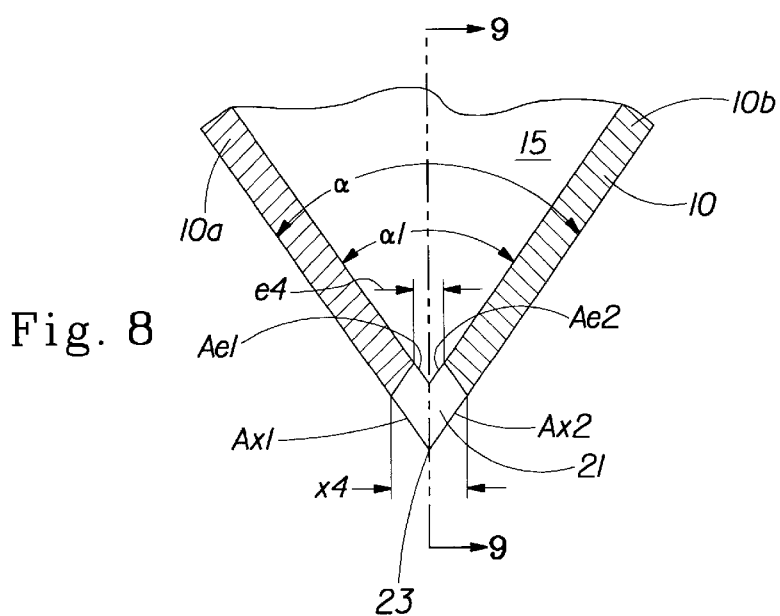
Fig. 8

EXTRUSION DIE

FIELD OF THE INVENTION

The present invention generally relates to extrusion processes and apparatuses therefor. More specifically, the present invention is concerned with processes and apparatuses for extruding chemical functional additives used in making disposable items, such as paper toweling, napkins, toilet tissue, facial tissue, etc.

BACKGROUND OF THE INVENTION

Extrusion dies for depositing an extrudable fluid onto a substrate are known in the art. Dies of a type generally known in the art as a coat-hanger die are described, for example, in the following U. S. patents: U.S. Pat. No. 4,043,739 issued on Aug. 23, 1997 to Appel and assigned to Kimberly-Clark Corporation; U.S. Pat. No. 4,372,739 issued on Feb. 8, 1983 to Vetter et al. and assigned to Röm GmbH of Darmstadt, Germany; U.S. Pat. No. 5,234,330 issued on Aug. 10, 1993 to Billow et al. and assigned to Eastman Kodak Company; U.S. Pat. No. 5,494,429 issued on Feb. 27, 1996 to Wilson et al. and assigned to Extrusion Dies, Inc. Several other types of extrusion apparatuses are disclosed, for example, in the following U.S. patents: U.S. Pat. No. 5,607,726 issued on March 1997 to Flattery et al. and assigned to E. D. du Pont de Nemours and Company; U.S. Pat. No. 5,522,931 issued to Iwashita et al. on Jun. 4, 1996 and assigned to Konica Corporation of Japan; U.S. Pat. No. 5,740,963 issued to Riney on Apr. 21, 1998 and assigned to Nordson Corporation; U.S. Pat. No. 5,511,962 issued to Lippert and assigned to Extrusion Dies, Inc.

One of the concerns relating to extrusion dies of prior art has been plugging of a die's discharge mouth, i. e., the outlet through which the extrudable fluid exits the extrusion die. Extrusion dies are frequently used in dusty environments. In papermaking, for example, some paper webs tend to be particularly prone to release surface fibers. A dust comprising primarily papermaking fibers may cause contamination of a chemical functional additive, such as, for example, a topical tissue softener, which is routinely deposited onto the paper web. Other common contaminants may include degradation products of the extrudable fluid itself, which particularly may occur in stagnant areas around the walls of the extrusion die. Build up of these degradation products can form over a period of time, harden and eventually separate from the walls of the die, thereby becoming a contaminant. More generally, particulate soil, sand, dirt, and grit tend to become airborne in the vicinity of the extrusion operation and settle into the supply of the extrudable fluid feeding the extrusion die.

If the chemical functional softener, for example, is deposited onto a substrate by extrusion, the contaminants, which have found their way into the functional additive being extruded, may plug the discharge outlet of the extrusion die. A process of cleaning of the extrusion dies is usually costly, for it involves stoppage of a production line and/or a substantial effort. The cleaning may be further complicated in extrusion dies designed to extrude very thin layers of extrudates and therefore comprising the discharge mouths having very small (in the range of 0.0002–0.00450 inches) dimensions requiring maintenance of high-precision tolerances.

Now it has been found that the discharge mouth having a divergently "flared" shape on a cross-section can beneficially mitigate, and even eliminate the problem of plugging of the discharge mouth. Accordingly, the present invention advantageously provides a novel extrusion apparatus comprising a discharge mouth having an entry open area and an exit open area which is greater than the entry orifice. The present invention also provides an advantage of an extrusion process which substantially eliminates plugging of the discharge mouth of the extrusion apparatus.

Other objects, features, and advantages of the present invention will be readily apparent from the following description taken in conjunction with accompanying drawings, although variations and permutations may be had without departing from the spirit and scope of the disclosure.

SUMMARY OF THE INVENTION

The present invention provides an extrusion die and a process for extruding an extrudable fluid onto a web substrate. A preferred extrudable fluid comprises a chemical functional additive commonly used in making consumer disposable articles, such as such as paper toweling, napkins, toilet tissue, facial tissue, sanitary napkins, diapers, etc. The extrudable fluid may be selected from the group consisting of softeners, emulsions, emollients, lotions, topical medicines, soaps, anti-microbial and anti-bacterial agents, moisturizers, coatings, inks and dies, and binders. A preferred web substrate comprises a fibrous web, such as, for example, a paper web. It is to be understood, however, that the extrusion die and the process of the present invention may be beneficially used with other types of the extrudable fluids and other types of the substrates.

An extrusion die of the present invention comprises a supply port and a distribution channel in fluid communication with the supply port. The distribution channel terminates with at least one discharge mouth having a passage cross-section therethrough. The discharge mouth comprises an entry orifice, an exit orifice, and a discharge distance therebetween. The entry orifice has an entry open area $A_e$, and the exit orifice has an exit open area $A_x$. According to the present invention, the exit open area $A_x$ is greater than the entry open area $A_e$. A ratio $A_x/A_e$ is preferably between about 1.1 and about 10, more preferably between about 1.2 and about 5, and most preferably between about 1.5 and about 2.

In a preferred embodiment of the extrusion die, the passage cross-section of the discharge mouth continuously and gradually increases from the entry open area $A_e$ to the exit open area $A_x$. The discharge mouth is flared, preferably gradually and continuously, in at least one cross-section. More preferably, the discharge mouth is flared in at least two mutually perpendicular cross-sections, and most preferably, the discharge mouth is gradually and continuously flared in any of its cross-sections, i. e., around 360°. The discharge mouth may have various configurations, including but not limited to: an elongate slot, a substantially circular aperture, and any combination thereof.

The discharge distance of the discharge mouth is preferably from about 0.0075 to about 0.1 inches, and more preferably from about 0.010 to about 0.050 inches. The exit open area $A_x$ of the discharge mouth is preferably from about 0.10 to about 2.5 square inches, and more preferably from about 0.2 to about 1.0 square inches.

In the preferred embodiment, the extrusion apparatus further has a knife-edge lip. The discharge mouth(s) are associated with the lip such that during the process of extruding the web substrate may contact the edge-knife lip. In a particularly preferred embodiment of the extrusion die comprising a plurality of the circular discharge mouths, the edge-knife lip extends between the exit orifices of the discharge mouths. Such discharge mouths can be formed by drilling flared holes in the die through the edge-knife lip.

The process of the present invention comprises the following steps: providing an extrudable fluid; providing a web substrate; providing an extrusion die of the present invention described herein above; extruding the extrudable fluid through the discharge mouth of the extrusion die, while continuously moving the web substrate relative to the extrusion die; and contacting the web substrate with the extrudate. During the process, at least some of relatively large contaminants contained in the extrudable fluid, i. e., those contaminants that have at least one dimension which is greater than at least one dimension of the entry open area, are precluded from entering the discharge mouth. At the same time, at least some of relatively small contaminants, i. e., the contaminants having at least one dimension which is less than at least one dimension of the entry open area, pass through the discharge mouth without being obstructed therein. It is believed that during the described process using the extrusion die of the present invention, plugging of the discharge mouth is substantially reduced or even avoided.

Some of the contaminants that are precluded from entering the discharge mouth may still be disposed in the proximity of the entry orifice, thereby restricting flow of the extrudable fluid through the discharge moth. To avoid this problem, a back-pressure may, for a short period of time, be applied to the extrudable fluid inside the distribution channel.

BRIEF DESCRIPTION OF THE DRAWINGS

FIG. 1 is a schematic perspective view of an exemplary process of the present invention showing one embodiment of an extrusion apparatus of the present invention in conjunction with a moving paper web.

FIG. 2 is a schematic partial cross-sectional view of the extrusion die of the present invention, showing a discharge mouth of the die.

FIG. 3 is a schematic and more detailed view of the discharge mouth shown in FIG. 2.

FIG. 3A is a schematic cross-sectional view of the discretely flared discharge mouth.

FIG. 4A is a schematic partial cross-sectional view of the extrusion apparatus, taken along lines 4—4 of FIG. 3, showing an embodiment of the discharge mouth.

FIG. 4B is a schematic partial cross-sectional view similar to that shown in FIG. 4A, showing another embodiment of the discharge mouth.

FIG. 5 is a schematic partial view taken in the direction of an arrow 5 of FIG. 4A, showing an embodiment of the discharge mouth comprising a circular aperture.

FIG. 6 is a schematic partial view similar to that shown in FIG. 5, showing another embodiment of the discharge mouth comprising an elongate slot.

FIG. 7 is a schematic partial view similar to that shown in FIG. 5, showing still another embodiment of the discharge mouth comprising an elongate slot.

FIG. 8 is a schematic partial cross-sectional view of the extrusion die of the present invention, having a discharge mouth comprising a knife-edge lip.

DETAILED DESCRIPTION OF THE INVENTION

Figure 9:
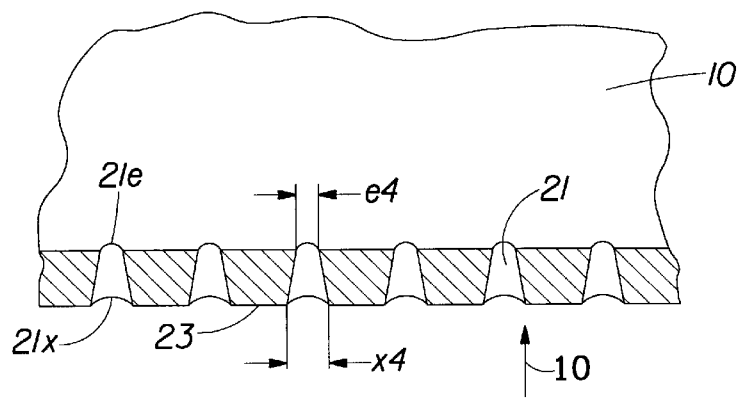
FIG. 9 is a schematic partial cross-sectional view of the extrusion apparatus, taken along lines 9—9 of FIG. 8.

An extrusion die 10 of the present invention comprises a body having a supply port 11 and a distribution channel 15 in fluid communication with the supply port 11, as schematically shown in FIGS. 1 and 2. As used herein, the term "supply port" 11 refers to an inlet in the body of the extrusion die 10, through which an extrudable fluid is supplied, preferably under pressure, into the distribution channel 15. As used herein, the term "extrudable fluid" refers to any fluid, including liquid, as well as gaseous material, which is capable of being extruded using the apparatus 10 and the process of the present invention. The examples of the extrudable fluid 80 include, but are not limited to: water; alcohol; functional additives, such as softeners (siloxanes, oils, quaternary ammonium, waxes, and others), emulsions, emollients, lotions, topical medicines, soaps, various anti-microbial and anti-bacterial agents, and moisturizers (for example, glycol); fillers, such, for example, as clay slurry; a variety of resins; coatings, such, for example, as clay and latex, and various opacifiers; inks and dies; binders; reactive and non-reactive vapors, such, for example, as oxygen and nitrogen.

In FIG. 1, a carrier 70 comprising a web substrate 50 is shown as moving in a machine direction MD. As used herein, the term "carrier" is generic and refers to any medium onto which the extrudate may be deposited according to the process of the present invention. Two embodiments of the preferred carrier 70 is a transfer roll (not shown) and a web substrate 50. One skilled in the art will appreciate that a transfer roll, such as, for example, an off-set roll may be used in a printing process for indirect application of the extrudate to the substrate.

The reference was also made to the "machine direction" designated in several drawings as a directional arrow "MD" and a "cross-machine direction" designated as a directional arrow "CD." As used herein, the term "machine direction" indicates a direction which is parallel to the flow of the substrate 50 through the equipment. The term "cross-machine direction" indicates a direction which is perpendicular to the machine direction and lies in the general plane of the substrate 70. In some embodiments of the process according to the present invention, the extrusion apparatus 10 may be disposed relative to the substrate 70 such that the outlet width W is parallel to the cross-machine direction CD, as schematically shown in FIGS. 2 and 4. It should be noted, however, that embodiments are possible, and may be even desirable, in which the outlet is disposed such that the widthwise direction is not parallel to the cross-machine direction CD, i. e., the direction of the outlet width W and the cross-machine direction CD form an acute angle therebetween (not shown).

In one preferred embodiment, the extrusion die 10 comprises a one-piece body. However, the extrusion die may be formed by two matching halves 10a and 10b (FIG. 1), a general design one skilled in the art will readily recognize. Each of the halves 10a and 10b has a cavity therein such that when the halves 10a and 10b are sealed together, their cavities form the distribution channel 15. As used herein, the term "distribution channel" 15 refers to a three-dimensional space, or hollowness, within the die 10, structured and designed to receive the extrudable fluid. As used herein, a term "lip" 20 (FIGS. 1 and 2) refers to a furthermost outer surface of the extrusion die 10, relative to a general direction of a flow of the extrudable fluid at the point of exiting the die 10. In some embodiments, the lip 20 may contact a substrate 50 (FIG. 1) onto which the extrudable fluid is deposited. In the embodiment of the die 10 comprising two halves 10a and 10b, the lip 20 may be formed by at least one of a leading lip (belonging to one of the halves 10a, 10b) and a trailing lip (belonging to the other of the halves 10a, 10b). In one preferred embodiment of the die 10 according to the present invention, the lip 20 comprises a "knife edge" i. e., a relatively sharp surface formed by two surfaces connected at an angle α, as best shown in FIG. 8.

The distribution channel 15 terminates with at least one discharge mouth 21 having a passage cross-section for the extrudable fluid to pass therethrough. As used herein, the term "discharge mouth" 21 refers to an opening, or hole, in the lip 20, through which opening the extrudable fluid exits the die 10, thereby forming an extrudate. As best shown in FIGS. 3, 4A, and 4B, the discharge mouth 21 comprises and extends between an entry orifice 21e, an exit orifice 21x. The discharge mouth has a discharge distance H defined between the entry orifice 21e and the exit orifice 21x. The discharge distance H is in the range of preferably 0.005–0.250 inches, more preferably 0.0075–0.100 inches, and most preferably 0.010–0.050 inches. It should be carefully noted that an angle α1 formed between the inner surfaces of the halves 10a and 10b may or may not be equal to the angle α (FIG. 8). Preferably, the angle α is greater than the angle α1. Thus, the discharge distance H may be minimized.

The passage cross-section of the discharge mouth 21 has a variable open area A which increases from the entry orifice 21x to the exit orifice 21x, as will be explained in more detail below. The entry orifice 21e has an entry open area Ae, and the exit orifice 21x has an exit open area Ax. As used herein, the term "entry open area" Ae is an area through which the extrudable fluid enters the discharge mouth 21; and the term "exit open area" Ax is an area through which the extrudable fluid exits the discharge mouth 21—and hence the extrusion die 10. Stated differently, the entry open area Ae and the exit open area Ax refer to areas through which the extrudable fluid consecutively passes when entering and exiting, respectively, the discharge mouth 21. The open areas Ae and Ae are typically measured in square units in a plan defined by a perimeter of a given open area—either a plan defined by the perimeter of the entry orifice 21e, or a plan defined by the perimeter of the exit orifice 21x, respectively. A reference was also made above to the generic term "open area" designated by "A" (FIG. 4A). The open area A refers to any area within the discharge mouth 21, which area is generally orthogonal to the flow of the extrudable fluid through the discharge mouth 21 and defined by a perimeter thereof at any point between the entry open area Ae and the exit open area Ax. One skilled in the art will appreciate that within the discharge distance H of the discharge mouth 21, i. e., between the entry open area Ae and the exit open area Ae, there may be unlimited number of cross-sectional open areas "A."

Figure 10:
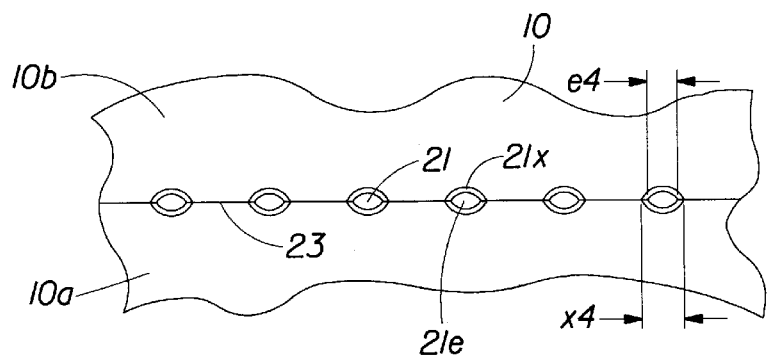
FIG. 10 is a schematic partial view taken in the direction of an arrow 10 of FIG. 9, showing an embodiment of the discharge mouth comprising a semi-circular aperture.

In some embodiments, both of the entry orifice 21e and the exit orifice 21x are disposed in plans that are generally orthogonal to the flow of the extrudable fluid (FIGS. 3, 4A, and 4B). If, however, at least one of the entry orifice 21e or a portion thereof and the exit orifice 21x or a portion thereof is disposed in a plan that is not orthogonal to the flow of the extrudable fluid (FIGS. 8–10), the entry open area Ae and/or the exit open area Ax is/are also not orthogonal to the flow of the extrudable fluid. In FIGS. 8–10, the extrusion die 10 has the knife-edge lip 20, formed between two surfaces at the angle α and a plurality of discharged mouths 21 having a circular shape. As one skilled in the art will appreciate, the circular shape of the discharge mouth 21 appears as a semi-elliptical shape in each of the plans of the surfaces which form the angle α. In FIGS. 8–10, the entry open area Ae comprises a first entry portion Ae1 and a second entry portion Ae2; and the exit open area Ax comprises a first exit portion Ax1, and a second exit portion Ax2. It should be carefully noted that in FIGS. 8–10, the first entry portion Ae1 is not parallel to the second entry portion Ae2, and the first exit portion Ax1 is not parallel to the second exit portion Ax2. Stated differently, each of the entry open area Ae and the exit open area Ax lies in two plans (FIG. 9), both of which may not be orthogonal to the flow of the extrudable fluid through the discharge mouth 21. It should also be noted that the first entry portion Ae1 need not be parallel to the first exit portion Ax1, and the second entry portion Ae2 need not be parallel to the second exit portion Ax2. In the embodiments principally shown in FIGS. 8–10, the discharge distance H may be computed as an average arithmetic of a first distance and a second distance, the first distance being a distance between a center of mass of the first entry portion Ae1 and a center of mass of the first exit portion Ax1, and the second distance being a distance between a center of mass of the second entry portion Ae2 and a center of mass of the second exit portion Ax2. Assuming that a longitudinal axis (not shown) of the discharge mouth 21 divides the angle α equally, a total exit open area Ax/2 of the single semi-elliptical portion (either Ax1 or Ax2) of the exit orifice 21x is equal to $Ax = \pi(x4)^2/4\cos[90° - (\alpha/2)°]$, where x4 is the diameter of the exit orifice 21x. Analogously, a total entry open area Ae/2 of the discharge mouth 21 may be computed. It should be kept in mind, however, that an angle formed between the surfaces in which the first entry portion Ae1 and the second entry portion Ae2 are formed may be different from the angle α.

Regardless of its specific embodiment, the discharge mouth 21 of the extruder die 10 of the present invention posses certain characteristics. According to the present invention, the exit open area Ax of the discharge mouth 21 is greater than the entry open area Ae thereof. This ensures that at least some of relatively large contaminants 30a (FIG. 4A) contained in the extrudable fluid and having at least one dimension which is greater than at least one dimension e2 of the entry open area 21e will be precluded from entering the discharge mouth. At the same time, at least some of relatively small contaminants 30b (FIG. 4A) contained in the extrudable fluid and having at least one dimension which is less than at least one dimension e2 of the entry open area 21e will pass through the discharge mouth 21 without being obstructed therein. In other words, if a particular contaminant is small enough to enter the discharge mouth 21 through the entry open area 21e thereof, it is will certainly pass through the exit open area 21x which is greater than the entry open area 21e. Thus, plugging of the discharge mouth 21 is substantially avoided. Preferably, a ratio Ax/Ae is between 1 and 10, more preferably the ratio Ae/Ax is between about 1.2 and 5, and most preferably the ratio Ae/Ax in between 1.5 and 2.

Preferably, the passage cross-section of the discharge mouth 21—and consequently the open area A—continuously and gradually increases from the entry open area Ae to the exit open area Ax. As used herein, by "continuous and gradual" increase of the open area A it is meant that any increase in a distance from the entry open area Ae to the exit open area Ax corresponds to an increase in the cross-sectional area A of the discharge mouth 21. In a given discharge mouth 21, the passage cross-section has a variable open area A that is minimal when the open area A comprises the entry open area Ae, and maximal when the open area A comprises the exit open area Ax. Preferably, a ratio Ax/H is from about 0.005 to about 10, more preferably, the ratio Ax/H is from about 0.10 to about 5, and most preferably, the ratio Ax/H is from about 0.10 to about 1.5

FIGS. 3–10 show several embodiments of the discharge mouth 21, according to the present invention. Preferably, the discharge mouth 21 is divergently flared in at least one cross-section, as shown in FIGS. 3 and 4B, viewed in combination. In the cross-section shown in FIG. 3, a dimension e1 of the entry orifice 21e is less than a dimension x1 of the exit orifice 21x, while in the cross-section shown in FIG. 4B (which is orthogonal to the cross-section of FIG. 3), a dimension e3 is equal to a dimension x3. More preferably, the discharge mouth 21 flared in at least two mutually perpendicular cross-sections, as shown in FIGS. 3 and 4A, viewed in combination. In FIG. 4A, a dimension e2 of the entry orifice 21e is less than a dimension x2 of the exit orifice 21x. Most preferably, the discharge mouth 21 is flared in each of its cross-sections, as best shown in FIGS. 5 and 7. While an embodiment is possible in which the discharge mouth 21 is flared discretely, or discontinuously, as shown in FIG. 3A, it is highly preferable that the discharge mouth 21 is gradually flared, as best shown in FIGS. 3 and 4A. As used herein, the requirement that the discharge mouth 21 is "gradually flared" refers to an uninterrupted continuity of an increase in the cross-sectional open area A of the discharge mouth 21 from the entry open area Ae to the exit open area Ax, wherein any increment in a distance from the entry open area Ae to the exit open area Ax corresponds to an increment in the cross-sectional area A of the discharge mouth 21. It should be understood that while in several embodiments walls 22 of the discharge mouth 21 are shown as straight lines (FIGS. 3 and 4A), embodiments are possible in which the walls 22 comprise curved lines (not shown).

Depending on requirements of a particular extrusion process, the discharge mouth 21 may comprise a variety of shapes and configurations. FIGS. 5 and 7, for example, show a plurality of the discharge mouths 21 distributed along the lip 20 of the die 10. In FIG. 5, the discharge mouth 21 comprises a circular aperture having a diameter e2 of the entry orifice and a diameter x2 of the exit orifice. FIG. 6 shows the discharge mouth 21 comprising an elongate slot extending throughout a width of the die 10, while FIG. 7 shows a plurality of the discharge mouths 21, each comprising an elongate slot. Other variations and permutations of shapes of the discharge mouth 21, including rectangular and irregular configurations (not shown) of the open areas, are included in the scope of the present invention.

One skilled in the art will know how to compute the entry open area Ae and the exit open area Ax, depending on their respective shapes. At least one method of computing an open area which has a non-circular (or irregular) shape involves an equivalent diameter. The term "equivalent diameter" is used herein to define the cross-sectional open area having a non-circular shape, in relation to the equal cross-sectional area having a circular geometrical shape. An open area of any geometrical shape can be described according to the formula: $A=\frac{1}{4}\pi D^2$, where "A" is the open area of any geometrical shape, $\pi=3.14159$, and "D" is the equivalent diameter. For example, an open area A having a rectangular shape can be expressed as a circle of an equivalent open area "a" having a diameter "d." Then, the diameter d can be calculated from the formula: $a=\frac{1}{4}\pi d^2$, where a is the known open area of the rectangle. In the foregoing example, the diameter d is the equivalent diameter D of this rectangular. Of course, the equivalent diameter of a circle is the circle's real diameter. Thus, in FIG. 5, the entry open area Ae of the discharge mouth 21 equals $Ae=\frac{1}{4}\pi(e2)^2$ where e2 is a diameter of the entry open area Ae; and the exit open area Ae of the discharge mouth 21 equals $Ae=\frac{1}{4}\pi(x2)^2$ where x2 is a diameter of the exit open area Ae.

FIGS. 8–10 show an exemplary embodiment of the die 10 of the present invention having the lip 20 which comprises a "knife edge." The knife-edge lip 20 is characterized by a relatively sharp edge 23 formed by two angled surfaces. During the extrusion process, the edge 23 preferably (but not necessarily) contacts a surface of the web 50. The preferred knife-edge lip 20 is especially suited for applications wherein the knife-edge 23 can beneficially provide attenuation of the extrudate by causing the substrate 50 to pass in the direction substantially parallel to and in contact with either the surface of the half 10a or the surface of the half 10b, or both, when the extrudate is being deposited into the substrate.

Figure 11:
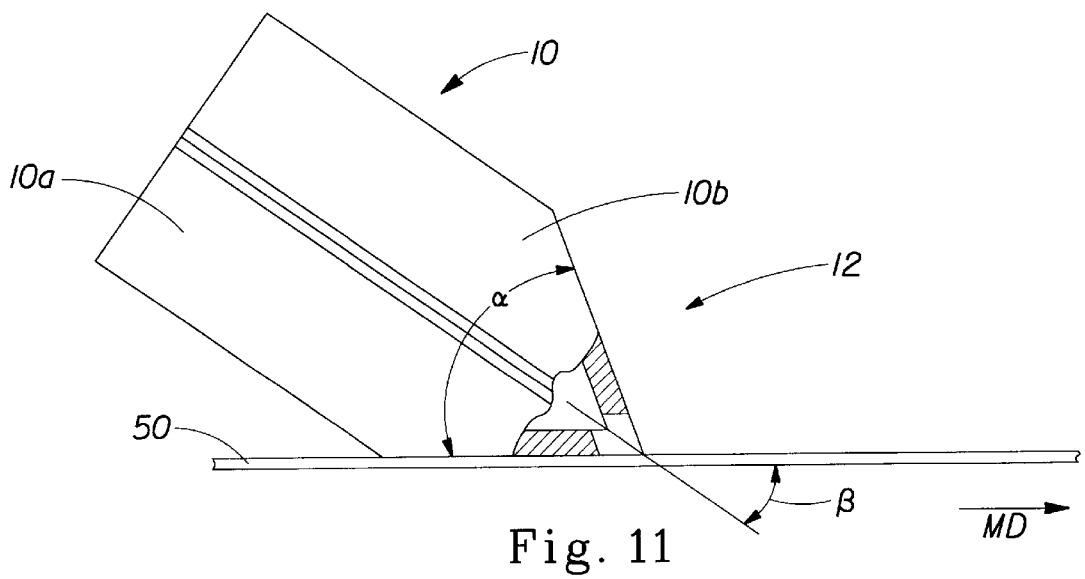
FIG. 11 is a schematic partial view of the extrusion apparatus shown in conjunction with a substrate.

FIG. 11 shows one preferred embodiment of the extrusion apparatus 10 having the knife-edge lip 20 contacting the substrate 50 moving in the machine direction MD. The die 10 has a plurality of circular mouths 21 consecutively spaced along the lip 20. Each mouth 21 has the entry open area Ae and the exit open area Ax, in accordance with the present invention. In FIG. 11, the extrudable fluid is deposited onto the substrate 50 at an acute angle, relative to the surface of the substrate 50. Stated differently, the die 10 and the substrate 50 are disposed relative to each other such that an angle β is formed between the general direction of the movement of the extrudable fluid through the discharge mouth 21 and the general plan of the substrate 50. This embodiment of the process, especially coupled with the semi-circular shape of the discharge mouth 21, is believed to be especially beneficial because it advantageously provides for gradual introduction of the extrudable fluid onto the substrate 50 or another carrier, such as, for example a printing roll. Typically, in a continuous process, a velocity of the substrate 50 is in the range of approximately 1000–5000 feet per minute, while a velocity of the extrudate is in the range of approximately 100–500 feet per minute. In some instances, this velocity differential may cause longitudinal discontinuity of the extrudate being deposited onto the substrate—due to a sudden acceleration of the extrudate at the moment of contacting the substrate. Without wishing to be bound by theory, applicants believe that the semi-circular shape of the discharge mouth 21 causes the extrudate to gradually (relative to the cross-machine direction CD) contact the substrate 50.

The first step of the process of the present invention comprises providing a carrier 50 having a width. A variety of materials may be used as the carrier 50. Examples include but are not limited to: paper, fabric, plastic, including film, metal, wood, woven and non-woven materials. The carrier 50 may comprise the web substrate, or alternatively—a printing roll (not shown). Structured papers, as well as non-structured papers, may be used as the carrier 50. Several examples of the structured papers may be found in the following commonly assigned U. S. patents: U.S. Pat. No. 4,529,480 issued Jul. 16, 1985 to Trokhan; U.S. Pat. No. 4,637,859 issued Jan. 20, 1987 to Trokhan; U.S. Pat. No. 5,364,504 issued Nov. 15, 1994 to Smurkoski, et al.; U.S. Pat. No. 5,529,664 issued Jun. 25, 1996 to Trokhan, et al.; and U.S. Pat. No. 5,679,222 issued Oct. 21, 1997 to Rasch, et al. Other examples of the papers that may be used as the substrate 50 are described in the following U. S. patents:

U.S. Pat. No. 3,301,746 issued Jan. 31, 1967 to Sanford, et al.; U.S. Pat. No. 3,974,025 issued Aug. 10, 1976 to Ayers; U.S. Pat. No. 4,191,609 issued Mar. 04, 1980 to Trokhan; and U.S. Pat. No. 5,366,785 issued Nov. 22, 1994 to Sawdai. One-ply, as well as multi-ply webs may be used as the substrate 50 in the present invention. The first step of the process of the present invention comprises providing a web substrate.

The next step comprises providing an extrusion die 10 according to the present invention and described in a sufficient detail above.

The next step comprises providing a chemical functional additive which is capable of being extruded with the extrusion die 10. The functional additive is preferably selected from the group consisting of softeners, emulsions, emollients, lotions, topical medicines, soaps, anti-microbial and anti-bacterial agents, moisturizers, coatings, inks and dies, and binders, the functional additive being extrudable with the extrusion die.

The next step comprises extruding the functional additive with the extrusion die 10. As has been discussed herein above, during extrusion, at least some of relatively large contaminants contained in the functional additive and having at least one dimension which is greater than at least one dimension of the entry open area are precluded from entering the discharge mouth, while at least some of relatively small contaminants contained in the functional additive and having at least one dimension which is less than at least one dimension of the entry open area pass through the discharge mouth without being obstructed therein, wherein plugging of the discharge mouth is substantially avoided.

The next step comprises contacting the web substrate 50 with the functional additive, thereby depositing the functional additive onto the web substrate.

What is claimed is:

1. An extrusion die for extruding a chemical functional additive for making a disposable paper product, the extrusion die comprising a supply port, a distribution channel in fluid communication with the supply port, and at least one lip terminating with a knife-edge, the distribution channel terminating with a plurality of circular or semi-circular discharge mouths consecutively spaced along and separated from one another by the knife-edge of the lip, each of the discharge mouths comprising an entry orifice, an exit orifice, and a passage having a discharge distance defined therebetween, the entry orifice having an entry open area Ae, and the exit orifice having an exit open area Ax, wherein cross-section of the passage for each of the discharge mouths is continuously flared in at least two mutually perpendicular cross-sections, from the entry orifice to the exit orifice, such that the exit open area Ax is greater than the entry open area Ae.

2. The extrusion die according to claim 1, wherein the cross-section of the passage discharge mouth is gradually flared.

3. The extrusion die according to claim 1, wherein a ratio Ax/Ae is between about 1.1 and about 10.

4. The extrusion die according to claim 3, wherein the ratio Ax/Ae is between 1.2 and 5.

5. The extrusion die according to claim 4, wherein the ratio Ax/Ae is between 1.5 and 2.

6. The extrusion die according to claim 1, wherein the discharge mouth is a circular aperture.

7. The extrusion die according to claim 6, wherein the discharge distance of the discharge mouth is from about 0.005 to about 0.250 inches.

8. The extrusion die according to claim 7, wherein the discharge distance of the discharge mouth is from about 0.0075 to about 0.100 inches.

9. The extrusion die according to claim 8, wherein the discharge distance of the discharge mouth is from about 0.010 to about 0.050 inches.

* * * * *